H. CAMERON.
METAL SHEARING AND PUNCHING MACHINE.
APPLICATION FILED MAY 21, 1918.

1,357,842.

Patented Nov. 2, 1920.

Inventor:
Harry Cameron
Per Ferdinand Bosshardt
Attorney.

UNITED STATES PATENT OFFICE.

HARRY CAMERON, OF MANCHESTER, ENGLAND.

METAL SHEARING AND PUNCHING MACHINE.

1,357,842.      Specification of Letters Patent.      Patented Nov. 2, 1920.

Application filed May 21, 1918. Serial No. 235,881.

*To all whom it may concern:*

Be it known that I, HARRY CAMERON, a subject of the King of Great Britain, residing at Manchester, in the county of Lancaster, England, have invented certain useful Improvements in Metal Shearing and Punching Machines, of which the following is a specification.

This invention relates to that type of metal shearing and punching machines in which a long stroke of the tool is obtained by rotating the eccentric which operates the tool slide or a lever connected therewith more than one revolution.

The object of this invention is to render such machines more powerful and to facilitate the cutting of the metal at an acute angle.

To this end the invention consists in the employment between the eccentric operated member and the tool slide of means for obtaining intermittently and progressively a long stroke of the tool slide.

The accompanying drawings illustrate a few embodiments of this invention.

Referring to the figures generally, $a$ is the slide carrying the tool, $b$ the eccentric operating either a slide or a lever and $c$ the said pawl or pawls or stepped member.

Figure 1:
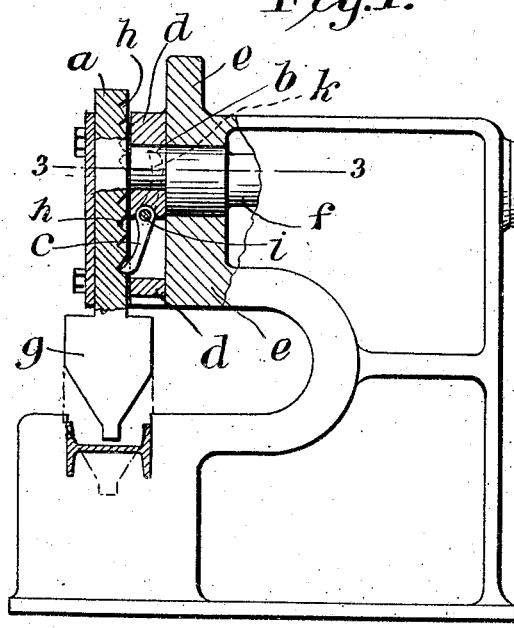
Figures 1 and 4 are side views partly in section of a shearing and punching machine constructed in accordance with this invention.
Figure 2:
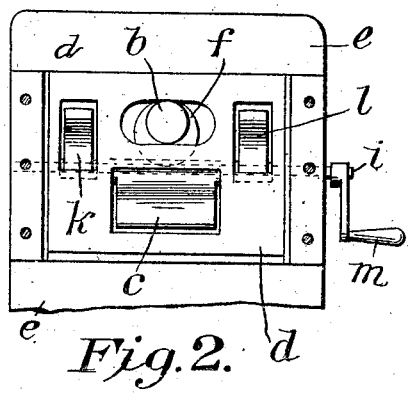
Fig. 2, is a detached front view with tool slide removed and Fig. 3, a detached sectional plan on line 3—3 of Fig. 1.
Figure 3:
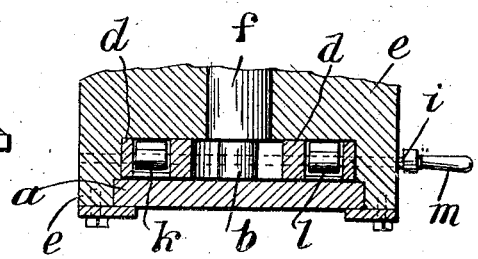

In carrying out this invention according to the embodiments shown in Figs. 1, 2 and 3, two slides $a$ and $d$ are employed in a common frame $e$, $d$ of which is operated by means of the eccentric $b$ on the driving shaft $f$ and $a$ of which carries the tool $g$ and has teeth $h$ in the side next to the slide $d$, which teeth or steps point in opposite directions.

In the slide $d$ is mounted a rocking shaft $i$ having secured thereto three pawls $c$, $k$, $l$, each housed in a cavity in the slide $d$.

The said rocking shaft has at one end a handle $m$ whereby the said pawls can be brought in and out of gear with the said teeth or into a neutral position.

When the bottom pawl $c$ is in gear with the lowest of the bottom teeth $h$, during the first revolution of the eccentric $b$, it will move the tool slide the first part of its stroke *i. e.* the distance of a tooth or step $h$. The pawls are then placed into a neutral position while the slide $d$ is raised by the eccentric $b$ and the bottom pawl $c$ brought into gear with the next tooth, which causes the tool slide $a$ to be moved down a further part of its stroke during the second revolution of the eccentric.

When the tool slide $a$ has completed its whole stroke, it is raised to its starting position by placing the top pawls, $k$, $l$ into gear with one of the teeth $h$ in the tool slide $a$ opposite thereto.

When the pawls $c$, $l$, $k$, are in a neutral position, the eccentric operated slide $d$ is free to move up and down without moving the tool slide $a$.

Figure 4:
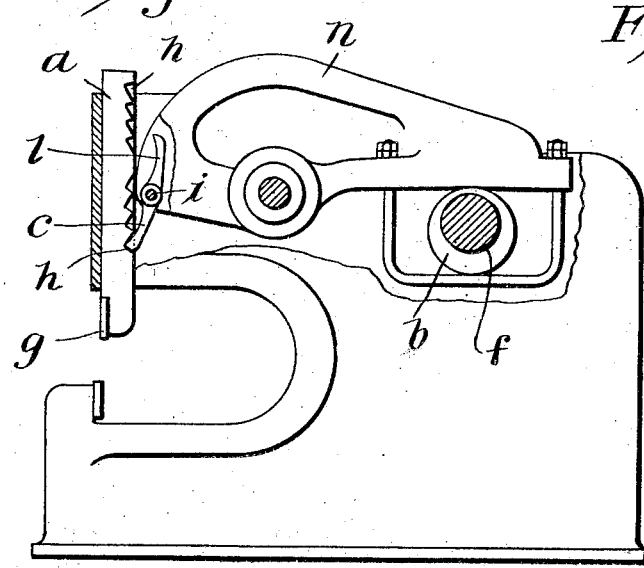

Referring to Fig. 4, in this embodiment the pawls $c$, $l$, are secured upon a rocking shaft $i$ mounted in the front end of the eccentric operated lever $n$, the action of the said pawls and tool slide being the same as described with reference to Figs. 1, 2, and 3.

I claim:

1. In a metal shearing or punching machine, a vertically reciprocating member, a vertically movable tool slide adjacent thereto, two superposed sets of teeth pointing in opposite directions formed in the face of said tool slide and means pivoted to said member adapted to be brought alternately in and out of engagement with said two sets of teeth to intermittently progressively depress and raise said tool slide, for the purpose specified.

2. In a metal shearing or punching machine, a vertically reciprocating member, a vertically movable tool slide adjacent thereto, two superposed sets of teeth pointing in opposite directions formed in the face of said tool slide and means pivoted to said member adapted to be brought alternately in and out of engagement with said two sets of teeth to intermittently progressively depress and raise said tool slide, said member consisting of a vertical slide and said means of a double pawl, for the purpose specified.

Signed at Manchester this 3rd day of May, 1918.

HARRY CAMERON.

Witnesses:
ALFRED BOSSHARDT,
M. I. BOSSHARDT.